US006795965B1

(12) United States Patent
Yadav (10) Patent No.: US 6,795,965 B1
(45) Date of Patent: Sep. 21, 2004

(54) MULTI-SOURCE PROGRAM MODULE UPDATER

(75) Inventor: Hanumant K. Yadav, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 409 days.

(21) Appl. No.: 09/670,985

(22) Filed: Sep. 26, 2000

Related U.S. Application Data (60) Provisional application No. 60/203,450, filed on May 10, 2000.

(51) Int. Cl.[7] .................................................. G06F 9/44
(52) U.S. Cl. ........................ 717/168; 717/103; 717/106; 717/171; 717/173; 709/201; 709/203
(58) Field of Search ................................. 717/103, 106, 717/168–169, 170, 171–178; 707/104.1, 10, 204; 709/204, 202, 201, 203, 220

(56) References Cited

U.S. PATENT DOCUMENTS

| | | | | |
|---|---|---|---|---|
| 5,257,379 A | * | 10/1993 | Cwiakala et al. ............... 713/1 |
| 5,359,730 A | * | 10/1994 | Marron ........................ 717/169 |
| 5,732,275 A | * | 3/1998 | Kullick et al. ............... 717/170 |
| 5,867,714 A | * | 2/1999 | Todd et al. .................. 717/172 |
| 5,870,609 A | * | 2/1999 | Thornton et al. ........... 717/175 |
| 6,167,567 A | * | 12/2000 | Chiles et al. ................ 717/173 |
| 6,169,994 B1 | * | 1/2001 | Lennert et al. .......... 707/104.1 |
| 6,442,754 B1 | * | 8/2002 | Curtis ......................... 717/175 |
| 6,453,470 B1 | * | 9/2002 | Gazda et al. ................ 717/174 |
| 6,463,584 B1 | * | 10/2002 | Gard et al. .................. 717/171 |
| 6,493,594 B1 | * | 12/2002 | Kraml .......................... 700/19 |
| 6,493,871 B1 | * | 12/2002 | McGuire et al. ............ 717/173 |
| 6,513,159 B1 | * | 1/2003 | Dodson ....................... 717/178 |
| 6,588,010 B1 | * | 7/2003 | Ogata .......................... 717/169 |
| 6,604,235 B1 | * | 8/2003 | Harrison et al. ............ 717/168 |
| 6,618,857 B1 | * | 9/2003 | Zimniewicz et al. ........ 717/175 |
| 6,637,023 B1 | * | 10/2003 | Ginsberg .................... 717/122 |
| 6,675,201 B1 | * | 1/2004 | Parkkinen ................... 709/216 |
| 6,698,017 B1 | * | 2/2004 | Adamovits et al. ......... 717/168 |
| 6,711,738 B1 | * | 3/2004 | Kuth et al. .................. 717/173 |
| 6,715,051 B2 | * | 3/2004 | Iwamura et al. ............ 711/165 |

OTHER PUBLICATIONS

TITLE: Compiler and Hardware Support for Cache Coherence in Large–Scale Multiprocessors, Design Considerations and Performance study, author: Choi et al, ACM, 1996.*

* cited by examiner

Primary Examiner—Chameli C. Das
(74) Attorney, Agent, or Firm—Lee & Hayes, PLLC (57) ABSTRACT

Described herein is a technology for automatically updating the most current program modules associated with a just-detected hardware device. In one described implementation, a program-module updater generates a list of to-be-copied program modules. Typically, these modules are associated with just-detected hardware devices. This implementation of the updater stores a data structure for each module in such list. Each data structure includes an entry that indicates the source location of the associated module. For example and typically, the source location is the original source location for the installation of the operating system. The updater implementation examines the list to identify any of the listed modules have been updated and it modifies the associated data structure of each updated module so that a source entry in each data structure indicates the updated source for the updated module. The updater copies all modules in the list to a hardware-specific program module storage location of a computer. The source of each module is indicated by its associated data structure.

31 Claims, 4 Drawing Sheets

MULTI-SOURCE PROGRAM MODULE UPDATER

CROSS-REFERENCE TO RELATED APPLICATIONS

This application claims priority from U.S. Provisional Patent Application Ser. No. 60/203,450 entitled "Multi Source Copy Queue" filed on May 10, 2000.

TECHNICAL FIELD

This invention relates to the installation of program modules from more than one available source. In particular, this invention relates to the installation of updated program modules from one or more updated sources instead of from an older, standard source.

BACKGROUND

Described herein this document are issues and techniques related to the Microsoft® Windows® operating systems (such as Windows® 95, Windows® 98, Windows NT®, Windows® 2000, Windows® Me). However, those of ordinary skill in the art understand and appreciate that the issues and techniques described herein may be applicable to any operating system (OS) that support an expansive and updateable set of hardware devices. Examples of such operating systems include: OS/2™, Linux, Unix™, Mac OS™, and BeOS™.

In particular, the issues and techniques described herein are applicable to an OS that support plug-and-play (PnP) technology. PnP refers to the ability of a computer system (and its supporting OS) to automatically configure expansion boards and other hardware devices. With PnP, a user should be able to plug in a device and play with it, without worrying about setting DIP switches, jumpers, and other configuration elements.

Herein, an exemplary "OS" is discussed—this OS may be any OS having the issues discussed. The details of the implementation of a particular OS may differ from the exemplary OS described herein, but issues faced by such an implementation may be same or similar.

Initial Hardware-Specific Program Module Installation

Figure 1:
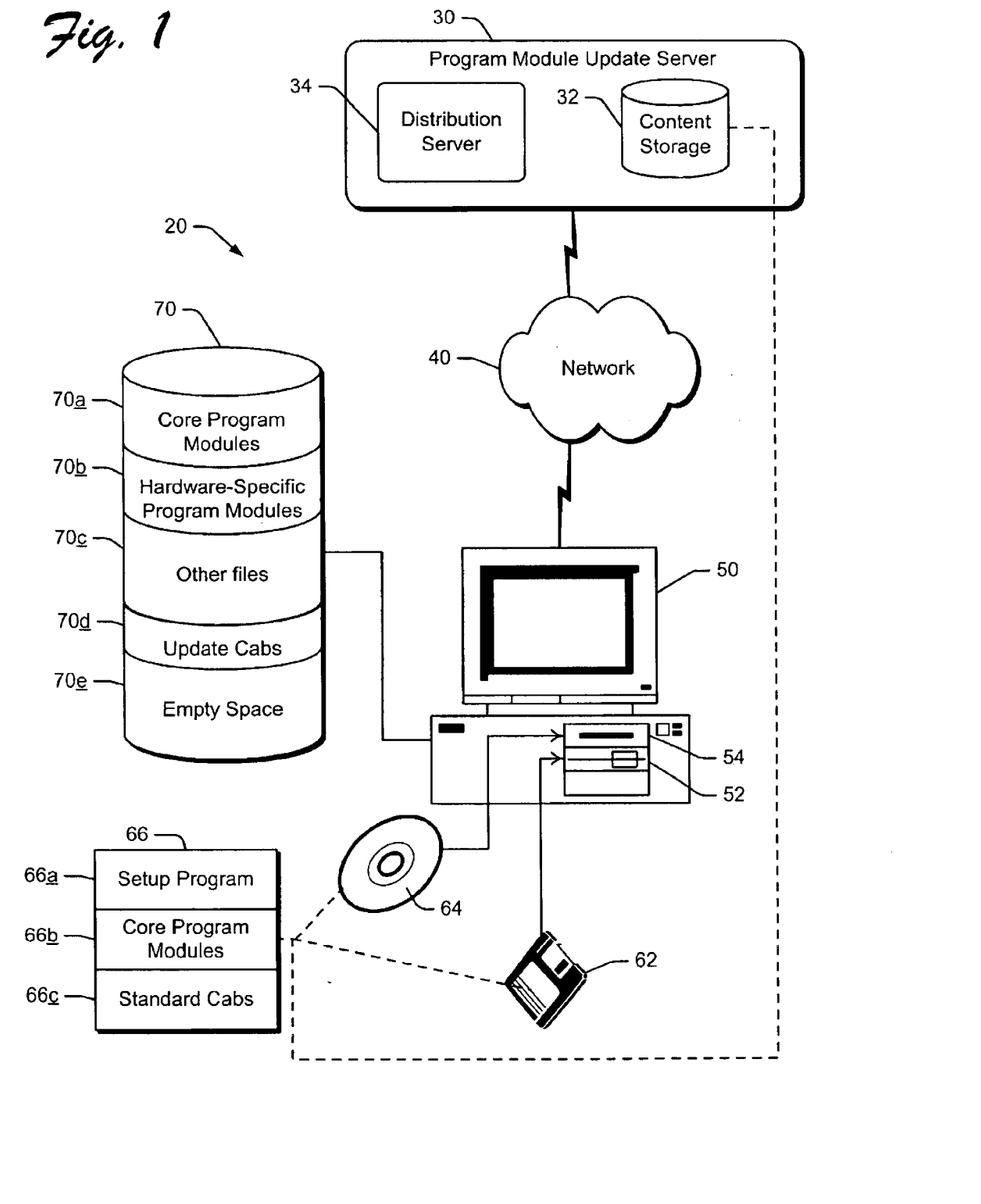
FIG. 1 is a block diagram of a computer/network environment with which an embodiment of a multi-source program module updater may be implemented.

FIG. 1 shows a typical personal computer 50. When first manufactured, a computer does not have an OS. Thus, the OS needs to be initially installed. In addition, the OS of existing computers are upgraded to a newer version of an OS.

Floppy disk(s) 62 and CD-ROM 64 represent potential OS installation source for computer 50. Also, server 30 represents a potential OS installation source for computer 50 over network 40.

Typically, an OS installation source (in a storage medium) contains a wide array of program modules—many of which are only installed if there is a need to do so. Block 66 illustrates examples of some of the program modules that might be found on an OS installation source: setup program 66a core program modules 66b, and standard cabinets ("cabs") 66c of hardware-specific program modules. Cabs are a series of linked compressed files in which hardware-specific program modules are stored. These hardware-specific modules are only necessary (and thus only need to be installed) when particular hardware is present in the computer.

This installation process is typically referred to as "setup." The program that performs the installation is typically called the "setup program." Program modules may be simply called "files" when referring to their status when stored on a storage medium.

During setup, program modules are unpacked and copied from the installation source onto the primary non-volatile storage system (such as a main hard drive 70 of FIG. 1) of the computer 50. This program-module duplication and organization has three major steps.

Core Files. First, the setup program copies the OS's core program modules (i.e., files) from the source represented by subblock 66b to a storage location 70a of the hard drive 70 of the computer 50. These files are the same core files installed into every computer regardless of the exact hardware configuration. An example of such a core file is the kernel of the OS.

Enumeration & Detection. Second, the setup program examines the is hardware environment of the computer 50. It detects, enumerates, and identifies the hardware devices found during this step. It generates an enumerated list of program modules (such as a device drivers) that are associated the hardware devices found during this step. These program modules are located in the standard cabs 66c of the installation source 66.

Hardware-Specific Program Module Installation. Third, the setup program copies the program modules in the enumerated list. It copies them from the standard cabs 66c of the installation source 66 to a hardware-specific program module storage location 70b on the hard drive 70 of the computer 50.

Undating Installed Hardware-Specific Program Modules

Core and hardware-specific program modules are updated periodically to enhance features and functions and to fix known bugs and problems. Occasionally, a collection of such updated program modules are released in a package called a "service pack" (SP).

Typically, the service pack installation is very similar to the initial OS installation except only those program modules that need updating are replaced by updated modules in the SP. Because hardware-specific modules for other non-installed devices do not exist on the computer 50, only the hardware-specific modules of installed hardware devices are updated by the SP. After the SP installation, the computer 50 has the latest core and hardware-specific program modules for its current hardware configuration.

Some hardware-specific program modules are utilized by multiple hardware devices. Therefore, updating one of those modules improves, corrects, and/or enables the performance multiple devices.

SP may be delivered to the computer 50 in the same manner as the initial installation. For example, it may be a CD-ROM 64, floppy disk 62, or over a network 40 (from server 30).

Later Hardware-Specific Program Module Installation

Often hardware is added to computer 50 after the initial installation. These hardware devices need program modules (such as device drivers) for the computer and the OS to support them. Many of these hardware devices are Plug-and-Play (PnP) and are automatically recognized and identified by the computer and its OS. Each hardware device is associated with a hardware-specific program module (such as device driver). Therefore, a PNP-capable computer and its OS attempt to automatically install the hardware-specific program module associated with the newly installed and PnP-recognized device.

Conventionally, the exemplary OS assumes that the original installation source is the location from which to install the hardware-specific program modules for the PnP-recognized device. Therefore, the hardware-specific modules are drawn from the standard cabs 66c of the original source 66.

The new device installation process pulls the associated program modules from the standard cabs 66c regardless of whether such modules are the most current in light of the SP. The device installation does not provide an automatic mechanism to check for the latest incarnation of a device's associated program module. Although it may provide a user a manual choice for a source location, this option is of little value unless the user knows from where to derive the latest file.

Assuming that its associated modules are obtained from the original source, a newly installed device on the computer 50 potentially has an old and possibly functionally out-of-date program module. Furthermore, if this is a common program module used by multiple devices, then the function and operation of other devices may fail or may result in incompatibilities.

Conventional Approach

Installation of an old hardware-specific program module when installing (or reinstalling) a just-detected hardware device may result in a problem. The old module has a potential to cause function failures, feature limitations, and/or incompatibilities.

The conventional approach to solving this problem is to educate the user to take additional steps after the just-installed device is installed. These additional steps involve manually installing an updated version (perhaps from a service pack) of the associated hardware-specific program module. This is a difficult approach because users expect the computer to automatically install the correct associated module because the installation is billed as plug-and-play (PnP).

SUMMARY

Described herein is a technology for automatically updating the most current program modules associated with a just-detected hardware device. In one described implementation, a program-module updater generates a list of to-be-copied program modules. Typically, these modules are associated with just-detected hardware devices. This implementation of the updater stores a data structure for each module in such list. Each data structure includes an entry that indicates the source location of the associated module. For example and typically, the source location is the original source location for the installation of the operating system.

The updater implementation examines the list to identify any of the listed modules have been updated and it modifies the associated data structure of each updated module so that a source entry in each data structure indicates the updated source for the updated module. The updater copies all modules in the list to a hardware-specific program module storage location of a computer. The source of each module is indicated by its associated data structure.

BRIEF DESCRIPTION OF THE DRAWINGS

The same numbers are used throughout the drawings to reference like elements and features.

DETAILED DESCRIPTION

The following description sets forth specific embodiments of the multi-source program module updater that incorporate elements recited in the appended claims. These embodiments are described with specificity in order to meet statutory written description, enablement, and best-mode requirements. However, the description itself is not intended to limit the scope of this patent. Rather, the inventors have contemplated that the claimed present invention might also be embodied in other ways, in conjunction with other present or future technologies.

Incorporation by Reference

The following provisional application (from which priority is claimed) is incorporated by reference herein: U.S. Provisional Patent Application Ser. No. 60/203450 entitled "Multi Source Copy Queue" filed on May 10, 2000.

Introductory Terminology

Described herein are exemplary implementations of the program-module updater (i.e., "exemplary program-module updater"). A program module is a generic term for any section of computer-executable instructions. A hardware-specific program module is a generic label for a program module that is associated with a specific hardware device and it is generally intended to facilitate computer interaction with such device. An example of such a hardware-specific program modules is a device driver.

General Exemplary Program-Module Updating Environment

FIG. 1 is described above (in the background section) as it is applicable to operating system (OS) installation and to conventional program-module updating. Now, FIG. 1 is described as it is applicable to the exemplary program-module updater.

FIG. 1 illustrates an overall program-module updating system 20. Such a system includes a subject computer 50 having conventional hardware components and an expandable, updateable OS. In this example, the computer 50 is a personal computer (PC) and the OS is a plug-and-play (PnP) OS, such as Microsoft® Windows® 98 SE.

The computer 50 is connected to a Program Module Update Server 30 via a network 40. The update server 30 includes a content storage 32 and a distribution server 34. The network 40 may be a local area network (LAN), wide-area network (WAN), the Internet, or the like.

The computer 50 has multiple storage devices, such as floppy disk drive 52, optical data drive 54, and a non-removable storage drive 70. A floppy disk 62 inserts into the floppy disk drive 52 of the computer. Likewise, an optical data disk 64 inserts into the optical data drive 54 of the computer. The non-removable storage drive 70 (e.g., hard drive) in the computer is not removable, as the name suggests.

Using the exemplary program-module updater, update cabs 70d is copied from the SP on the non-removable drive 70. Thus, the non-removable drive 70 includes core program modules 70a, hardware-specific program modules 70b, other files 70c, update cabs 70d, and unused space 70e.

Assume that later a device is installed. This device has an updated hardware-specific program module stored away in the update cabs 70d. Instead of pulling an old hardware-specific program module from the standard cabs 66c, the exemplary program-module updater will redirect the computer to access the updated hardware-specific program module in the update cabs 70d on the hard drive of the computer.

Alternatively, the update cabs may be stored in content storage 32 of the Program Module Update Server (PMUS) 30. As it is needed, distribution server 34 sends the appropriate program module updates to the computer 50.

Exemplary Program-Module Updater

Figure 2:
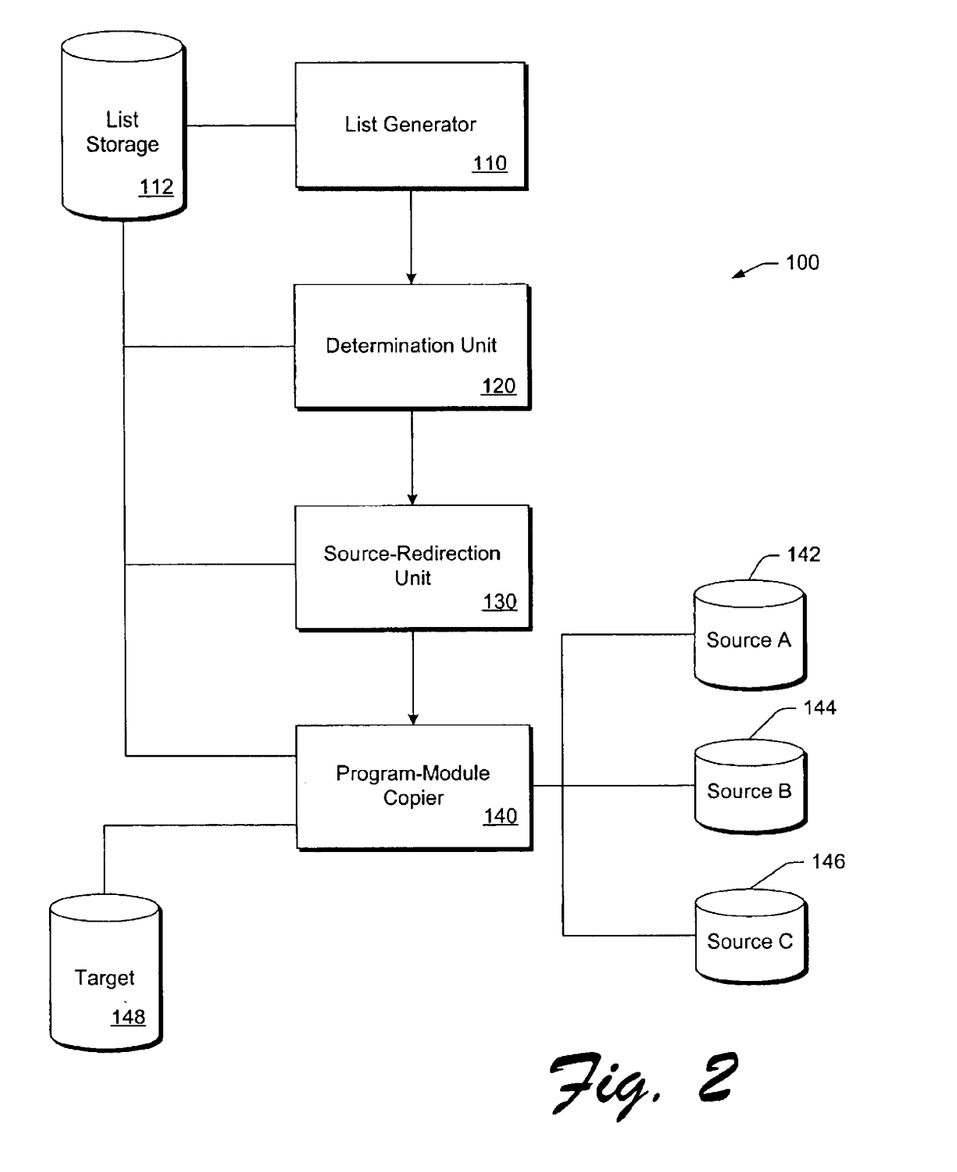
FIG. 2 is a block diagram of an implementation of a multi-source program module updater.

FIG. 2 shows an embodiment of the exemplary multi-source program-module updater 100. This embodiment may be implemented in software, hardware, or a combination thereof. An example of such software includes an OS, a setup application for an OS, an OS update application, and a software installation application.

This embodiment includes a list generator 110 for generating a list of to-be-copied program modules. This list is stored in list storage 112. Each entry in the list is an instance of a data structure with information regarding a program module. Included in that data structure is a source location (i.e., locus) from which the program module itself may be obtained.

A determination unit 120 examines the list of program modules and determines which modules have been updated since the original installation. It may do this by comparing the names of the modules in the to-be-copied list (stored in list storage 112) with another list. This other list includes the names of program modules that have been updated since the original installation. This other list may identify the updated source location for the updated modules.

A source-redirection unit 130 modifies the data structures of the updated program modules (identified by the determination unit). Such modification indicates the source location of the updated versions of the program modules.

A program-module copier 140 copies program modules from a source to a target. It copies program modules in the list stored in list storage 112. The target is defined. In FIG. 2, the target is Target disk 148. The source of each program module is determined by the source location indicated in the data structure of each program module. For example, the source may be Source A disk 142, Source B disk 144, or Source C disk 144.

Methodological Implementation of Exemplary Program-Module Updater

Figure 3:
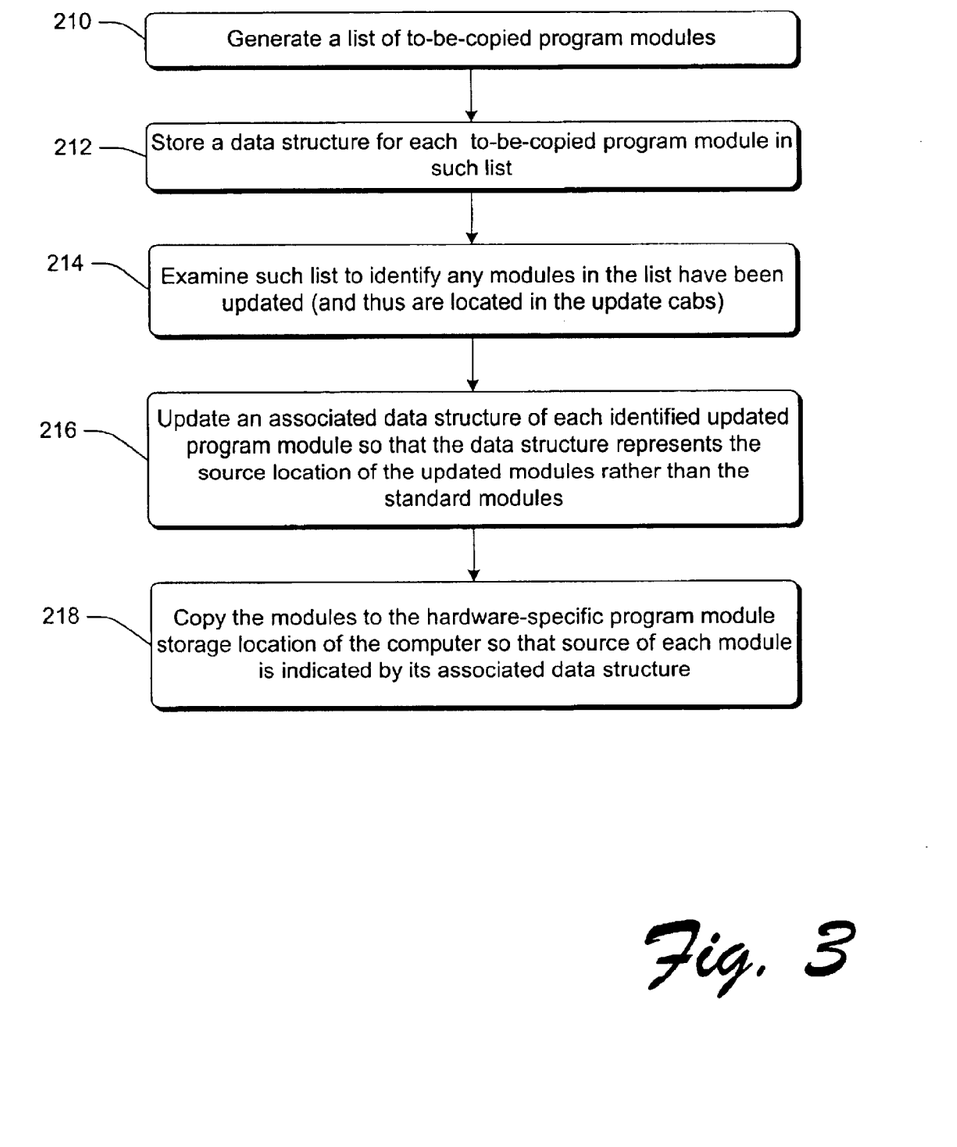
FIG. 3 is a flow diagram showing a methodological implementation of a multi-source program module updater.

FIG. 3 shows a methodological implementation of the exemplary multi-source program-module updater performed by the program-module updater 100. This methodological implementation may be performed in software, hardware, or a combination thereof.

At 210 of FIG. 3, the exemplary program-module updater generates a list of to-be-copied program modules. Typically, this list of to-be-copied program modules is generated when one or more hardware devices are installed on (or initially detected by) the computer 50. Hardware-specific program modules are associated with such new devices. Those modules are included in the list.

Assume an exemplary case where an OS has a program module called "setupx.dll" implementing the exemplary program-module updater. Setupx.dll called a main function called "VcpClose( )" once an triggering event occurs—such as an "inf"-based operation is performed (such an operation includes "copy files", "delete files", "add registry", "delete registry"). The VcpClose( ) function performs the desired inf-based operation.

At 212 of FIG. 3, the exemplary updater stores a data structure for each module in such list. Each data structure includes an entry that indicates the source location of the associated module. For example and typically, the source location is the original source location for the installation of the OS. It may be, for example, standard cabs 66c of floppy disk 62.

In the "setupx.dll" example, each module in the list has an associated data structure called LOGDISKDESC_S in the following format:

```
typedef struct _LOGDISKDESC_S ( /* ldd */
    WORD        cbSize;         // Size of this structure (bytes)
    LOGDISKID   ldid;           // Logical Disk ID.
    LPSTR       pszPath;        // Ptr. to associated Path string.
    LPSTR       pszVolLabel;    // Ptr. to Volume Label string.
    LPSTR       pszDiskName;    // Ptr. to Disk Name string.
    WORD        wVolTime;       // Volume label modification time.
    WORD        wVolDate;       // Volume label modification date.
    DWORD       dwSerNum;       // Disk serial number.
    WORD        wFlags;         // Flags.
} LOGDISKDESC_S, FAR *LPLOGDISKDESC;
```

Collectively, the "ldid", "pszVolLabel", and "psZDiskName" fields in the above data structure indicate the source location for acquiring the program module associated with a given instance of such structure.

At 214 of FIG. 3, the exemplary updater examines the list to identify any of the listed modules have been updated (and thus their updated source is located in the update cabs.) At 216, the exemplary updater modifies the associated data structure of each updated module so that a source entry in each data structure indicates the updated source for the updated module.

At 218 of FIG. 3, the exemplary updater copies all modules in the list to the hardware-specific program module storage location 70b of the computer 50. The source of each module is indicated by its associated data structure. Such source may be the standard cabs 66c or the update cabs 70d.

In reference again to the "setupx.dll" example, when the VcpClose( ) function performs a copy operation, it copies a specified list of program modules (typically, device drivers and DLLs) from a source location to the hard drive of the computer. Before any modules are copied, VcpClose( ) calls another function called CheckAndPreserveFiles( ) to examine the list and determine if any of the listed modules have an updated source location.

A stored file may contain a list of all modules that have been updated. In addition, it may contain a list of all modules of the OS and their most current source. In this "setupx.dll" example, the OS contains a file called "layout.inf" that lists the names and locations of all program modules of the OS. In this example, it may be modified to include the locations of the updated source of each module.

If the CheckAndPreserveFiles( ) function finds such a module, it updates the "ldid", "pszVolLabel", and "pszDiskName" fields of the instance of the LOGDISKDESC_S data structure associated with such module. Once these change are made, the list is returned to the calling functions for normal processing.

Exemplary Alternative Implementations

Multiple Service Packs. Conventionally, the last applied SP overrides and overwrites any previous existing SPs. Hence, subsequent SPs must contain all updated program modules that were part of a previous SP. For example, if "kmixer.sys" was updated in service pack 1 (SP1), but service pack 2 (SP2) did not contain any changes for "kmixer.sys", SP2 must include "kmixer.sys." Otherwise, the updated version of "kmixer.sys" would be lost when SP2 was applied over SP1.

To ameliorate that problem, update cabs 70d may include multiple cabs from multiple SP updates. There may be multiple update cabs at different locations (e.g., over a network, on floppy, on hard disk, etc.) An implementation of a multi-source program module updater may support for multiple updates (e.g., multiple service packs). With each SP update, a new update cab is added or the existing update cab is updated.

With this alternative implementation, the registry may contain a list of modules and the name of the cab that contains the updated module. For example, the registry may contain the following entries:

Kmixer.sys, sp1.cab

Setupx.dll, sp2.cab

The exemplary updater may change the Idid, pszVolLabel and pszDiskName fields of the LOGDISKDESC_S structure based on the name of the program module and cab name combination when a match was found. As a result, the cab for SP2 need not contain the SP1 files. Thus, cabs may be smaller. Thus, download times may be quicker in case this SP is distributed over the Internet.

Multiple Lists. In another alternative implementation, an exemplary updater may maintain multiple separate lists. One list is for those modules from the standard cabs. Each of the others is from a particular update cab.

This implementation collectively copies all of the program modules from a given cab before moving on to the next cab. It does this until all cabs are copied.

Exemplary Computing Environment

Figure 4:
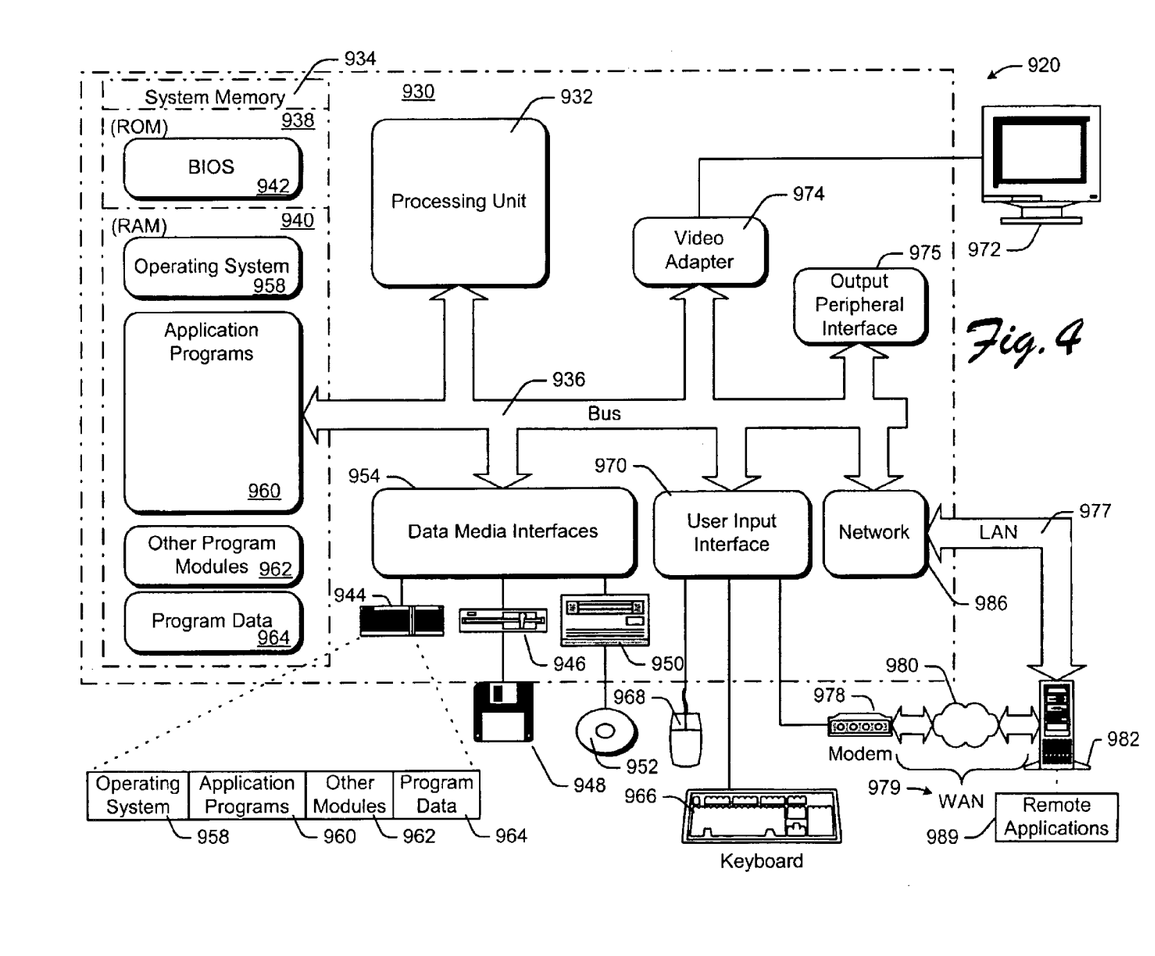
FIG. 4 is an example of a computing operating environment capable of implementing an implementation of a multi-source program module updater.

FIG. 4 illustrates an example of a suitable computing environment 920 on which the exemplary program-module updater may be implemented.

Exemplary computing environment 920 is only one example of a suitable computing environment and is not intended to suggest any limitation as to the scope of use or functionality of the exemplary program-module updater. Neither should the computing environment 920 be interpreted as having any dependency or requirement relating to any one or combination of components illustrated in the exemplary computing environment 920.

The exemplary program-module updater is operational with numerous other general purpose or special purpose computing system environments or configurations. Examples of well known computing systems, environments, and/or configurations that may be suitable for use with the exemplary program-module updater include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary program-module updater may be described in the general context of computer-executable instructions, such as program modules, being executed by a computer. Generally, program modules include routines, programs, objects, components, data structures, etc. that perform particular tasks or implement particular abstract data types. The exemplary program-module updater may also be practiced in distributed computing environments where tasks are performed by remote processing devices that are linked through a communications network. In a distributed computing environment, program modules may be located in both local and remote computer storage media including memory storage devices.

As shown in FIG. 4, the computing environment 920 includes a general-purpose computing device in the form of a computer 930. The components of computer 920 may include, by are not limited to, one or more processors or processing units 932, a system memory 934, and a bus 936 that couples various system components including the system memory 934 to the processor 932.

Bus 936 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA EISA) bus, Video Electronics Standards Association (VESA) local bus, and Peripheral Component Interconnects (PCI) bus also known as Mezzanine bus.

Computer 930 typically includes a variety of computer readable media. Such media may be any available media that is accessible by computer 930, and it includes both volatile and non-volatile media, removable and non-removable media.

In FIG. 4, the system memory includes computer readable media in the form of volatile memory, such as random access memory (RAM) 940, and/or non-volatile memory, such as read only memory (ROM) 938. A basic input/output system (BIOS) 942, containing the basic routines that help to transfer information between elements within computer 930, such as during start-up, is stored in ROM 938. RAM 940 typically contains data and/or program modules that are immediately accessible to and/or presently be operated on by processor 932.

Computer 930 may further include other removable/non-removable, volatile/non-volatile computer storage media. By way of example only, FIG. 4 illustrates a hard disk drive 944 for reading from and writing to a non-removable, non-volatile magnetic media (not shown and typically called a "hard drive"), a magnetic disk drive 946 for reading from and writing to a removable, non-volatile magnetic disk 948 (e.g., a "floppy disk"), and an optical disk drive 950 for reading from or writing to a removable, non-volatile optical disk 952 such as a CD-ROM, DVD-ROM or other optical media. The hard disk drive 944, magnetic disk drive 946, and optical disk drive 950 are each connected to bus 936 by one or more interfaces 954.

The drives and their associated computer-readable media provide nonvolatile storage of computer readable instructions, data structures, program modules, and other data for computer 930. Although the exemplary environment described herein employs a hard disk, a removable magnetic disk 948 and a removable optical disk 952, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 948, optical disk 952, ROM 938, or RAM 940, including, by way of example, and not limitation, an operating system 958, one or more application programs 960, other program modules 962, and program data 964.

A user may enter commands and information into computer 930 through input devices such as keyboard 966 and pointing device 968 (such as a "mouse"). Other input devices (not shown) may include a microphone, joystick, game pad, satellite dish, serial port, scanner, or the like. These and other input devices are connected to the processing unit 932 through an user input interface 970 that is coupled to bus 936, but may be connected by other interface and bus structures, such as a parallel port, game port, or a universal serial bus (USB).

A monitor 972 or other type of display device is also connected to bus 936 via an interface, such as a video adapter 974. In addition to the monitor, personal computers typically include other peripheral output devices (not shown), such as speakers and printers, which may be connected through output peripheral interface Computer 930 may operate in a networked environment using logical connections to one or more remote computers, such as a remote computer 982. Remote computer 982 may include many or all of the elements and features described herein relative to computer 930.

Logical connections shown in FIG. 4 are a local area network (LAN) 977 and a general wide area network (WAN) 979. Such networking environments are commonplace in offices, enterprise-wide computer networks, intranets, and the Internet.

When used in a LAN networking environment, the computer 930 is connected to LAN 977 network interface or adapter 986. When used in a WAN networking environment, the computer typically includes a modem 978 or other means for establishing communications over the WAN 979. The modem 978, which may be internal or external, may be connected to the system bus 936 via the user input interface 970, or other appropriate mechanism.

Depicted in FIG. 4, is a specific implementation of a WAN via the Internet. Computer 930 typically includes a modem 978 or other means for establishing communications over the Internet 980. Modem 978, which may be internal or external, is connected to bus 936 via interface 970.

In a networked environment, program modules depicted relative to the personal computer 930, or portions thereof, may be stored in a remote memory storage device. By way of example, and not limitation, FIG. 4 illustrates remote application programs 989 as residing on a memory device of remote computer 982. It will be appreciated that the network connections shown and described are exemplary and other means of establishing a communications link between the computers may be used.

Exemplary Operating Environment

FIG. 4 illustrates an example of a suitable operating environment 920 in which the exemplary program-module updater may be implemented. Specifically, the exemplary program-module updater is implemented by any program 960–962 or operating system 958 in FIG. 4.

The operating environment is only an example of a suitable operating environment and is not intended to suggest any limitation as to the scope of use of functionality of the exemplary program-module updater described herein. Other well known computing systems, environments, and/or configurations that may be suitable for use with the exemplary program-module updater include, but are not limited to, personal computers, server computers, hand-held or laptop devices, multiprocessor systems, microprocessor-based systems, programmable consumer electronics, wireless communications equipment, network PCs, minicomputers, mainframe computers, distributed computing environents that include any of the above systems or devices, and the like.

Computer-Executable Instructions

An implementation of the exemplary program-module updater may be described in the genera l context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Computer Readable Media

An implementation of the exemplary program-module updater may be stored on or transmitted across some form of computer readable media. Computer readable media can be any available media that can be accessed by a computer. By way of example, and not limitation, computer readable media may comprise computer storage media and communications media.

Computer storage media include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Communication media typically embodies computer readable instructions, data structures, program modules, or other data in a modulated data signal such as carrier wave or other transport mechanism and included any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Conclusion

Although the multi-source program-module updater has been described in language specific to structural features and/or methodological steps, it is to be understood that the improved program-module updater defined in the appended claims is not necessarily limited to the specific features or steps described. Rather, the specific features and steps are disclosed as preferred forms of implementing the claimed present invention.

What is claimed is:

1. A program-module update system, a program module being a section of computer-executable instructions, the system comprising:
    a determination unit for determining whether a hardware-specific program module is an updated program module, implemented in response to detection of a hardware device; and
    a source-redirection unit for specifying a source locus for a program module determined to be an updated program module by the determination unit.

2. A system as recited in claim 1 further comprising a list generator for providing a list of hardware-specific program modules, wherein the determination unit determines whether a module listed in such list is an updated module.

3. A system as recited in claim 1 further comprising a program-module copier for copying a hardware-specific program module from the specified source locus to a target locus.

4. A system as recited in claim 1, wherein the source locus is on a non-removable storage medium.

5. A system as recited in claim 1, wherein the source locus is on a removable storage medium.

6. A system as recited in claim 1, wherein the source locus is on a storage medium remotely connected to the program-module update system via a network.

7. A software installation application comprising a program-module update system as recited in claim 1.

8. An operating system update application comprising a program-module update system as recited in claim 1.

9. An operating system comprising a program-module update system as recited in claim 1.

10. A program-module update system, a program module being a section of computer-executable instructions, the system comprising:

a source-redirection unit for specifying a source locus for a hardware-specific program module to be copied to a target locus, implemented in response to detection of a hardware device; and a program-module copier for copying the program module from the specified source locus to the target locus.

11. A system as recited in claim 10 further comprising a determination unit for determining whether a hardware-specific program module is an updated program module so that the source-redirection unit specifies a locus for modules determined to be an updated module by the determination unit.

12. A system as recited in claim 10, wherein the source locus is on a non-removable storage medium.

13. A system as recited in claim 10, wherein the source locus is on a removable storage medium.

14. A system as recited in claim 10, wherein the source locus is on a storage medium remotely connected to the program-module update system via a network.

15. A software installation application comprising a program-module update system as recited in claim 10.

16. An operating system comprising a program-module update system as recited in claim 10.

17. A method of updating a program module, a program module being a section of computer-executable instructions, the method comprising:

determining whether a hardware-specific program module is an updated program module implemented in response to detection of a hardware device; and specifying a source locus for a program module determined to be an updated program module by the determining.

18. A method as recited in claim 17 further comprising:

generating a list of hardware-specific program modules; and providing such list to the determining.

19. A method as recited in claim 17 further comprising copying a hardware-specific program module from the source locus specified by the specifying to a target locus.

20. A method as recited in claim 17, wherein the source locus is on a non-removable storage medium.

21. A method as recited in claim 17, wherein the source locus is on a removable storage medium.

22. A method as recited in claim 17, wherein the source locus is on a storage medium remotely connected via a network.

23. A computer-readable medium having computer-executable instructions that, when executed by a computer, performs the method as recited in claim 17.

24. A computer-readable medium having computer-executable instructions that, when executed by a computer, perform a method of updating program modules, a program module being a section of computer-executable instructions, the method comprising:

detecting a hardware device;

determining whether a hardware-specific program module is an updated program module in response to detection of a hardware device; and specifying a source locus for a program module determined to be an updated program module by the determining.

25. A modulated signal updating a program module, a program module being a section of computer-executable instructions, the modulated signal generated in accordance with the following acts:

detecting a hardware device;

determining whether a hardware-specific program module is an updated program module in response to detection of a hardware device; and specifying a source locus for a program module determined to be an updated program module by the determining.

26. A method of updating a program module, a program module being a section of computer-executable instructions, the method comprising:

detecting a hardware device;

obtaining a list of program-module data structures, each data structure being associated with a hardware-specific program module and identifying a source locus where the associated module is stored;

examining such list;

determining whether a program module associated with a data structure is an updated program module in response to detection of a hardware device; and modifying the data structure associated with a program module determined to be an updated program module by the determining so that a new source locus is identified in the associated data structure.

27. A method as recited in claim 26 further comprising copying a hardware-specific program module from the source locus identified in the data structure associated with the program module to a target locus.

28. A method as recited in claim 26, wherein the source locus identified in a data structure associated with a program module is on a non-removable storage medium.

29. A method as recited in claim 26, wherein the source locus identified in a data structure associated with a program module is on a removable storage medium.

30. A method as recited in claim 26, wherein the source locus identified in a data structure associated with a program module is on a storage medium remotely connected via a network.

31. A computer-readable medium having computer-executable instructions that, when executed by a computer, performs the method as recited in claim 26.

* * * * *